United States Patent Office 3,216,799
Patented Nov. 9, 1965

3,216,799
PROCESS FOR PREPARING PHOSPHORUS PENTAFLUORIDE
Franciszek Olstowski, Freeport, Tex., assignor to The Dow Chemical Company, Midland, Mich., a corporation of Delaware
No Drawing. Filed July 17, 1962, Ser. No. 210,542
4 Claims. (Cl. 23—205)

This invention relates to the preparation of phosphorus pentafluoride and more particularly is concerned with a process for recovering phosphorus pentafluoride (phosphorous (V) fluoride) from alkali metal hexafluorophosphates.

It is known that alkali metal hexafluorophosphates slowly thermally decompose at high temperatures to yield some of the corresponding phosphorus pentafluoride. This reaction is aided by low pressures. For example, potassium hexafluorophosphate, $KPF_6$, at temperatures above about 570° C., and preferably at reduced pressures, decomposes slowly to yield KP and $PF_5$ along with $PF_3$ as a coproduct.

Now unexpectedly it has been found by the instant method that phosphorus pentafluoride can be liberated from alkali metal hexafluorophosphates at relatively low temperatures of from about 100° C. to about 400° C., and preferably at from about 200° C. to about 350° C., at atmospheric pressures. In this process an alkali metal hexafluorophosphate is reacted with a substantially anhydrous, acidic inorganic halide at moderate reaction temperatures as set forth hereinbefore. The reaction is carried out over a period of from about 30 minutes to about 3 hours or more and preferably from about 1 to about 2 hours.

The molar ratio of reactants employed, ranges from about 0.4 to about 2, expressed as acidic inorganic halide/alkali metal hexafluorophosphate, based on that required for stoichiometric reaction between the inorganic halide and the alkali metal hexafluorophosphate and preferably about stoichiometric molar equivalents of reactants are employed.

Although acidic inorganic halides, i.e. the chlorides, bromides and iodides can be employed in the present process, preferably the chlorides are used. The term "inorganic acid halide" or "inorganic acid chloride" as used herein refers to those substances which hydrolyze or dissolve in water to form acidic solutions.

Particularly suitable acidic inorganic chlorides for use in the instant process for example are substantially anhydrous hydrogen chloride (HCl), prosphorous pentachloride ($PCl_5$), antimony pentachloride ($SbCl_5$), iron trichloride ($FeCl_3$), chromium trichloride ($CrCl_3$), aluminum trichloride ($AlCl_3$), stannic chloride ($SnCl_4$) and the like and mixtures thereof.

Although the instant reaction readily proceeds at the indicated temperatures at atmospheric pressure, if desired subatmospheric pressures can be employed.

The reaction can be carried out in batch-type or continuous operation employing reactor equipment and material handling techniques as known to one skilled in the art.

The materials of construction to be used in the processing equipment are those which are substantially corrosion resistant to the reactants and products at the processing conditions and have the requisite structural strength and physical characteristics to withstand the temperatures and pressures employed. Preferably nickel, stainless steel, nickel-lined or stainless steel-lined reaction equipment is used in the present process.

The following examples will serve further to illustrate the present invention but are not meant to limit it thereto.

*Example 1*

Nineteen grams of $KPF_6$ (about 0.1 gram mole) and about 10 grams of $PCl_5$ (about 0.05 gram mole) were introduced into a nickel reactor of about 1 inch inside diameter and about 10 inches long. An outlet tube connected to the reactor led to a gas collecting receiver. The reactor and contents were slowly heated with perceptible gas evolution becoming noticeable at about 56° C. As the reactor temperature reached about 110° C., a rapid gas evolution was observed. Infrared analysis of the product evolved at the 110° C. temperature indicated the presence of phosphorous pentafluoride, phosphorous oxyfluoride ($POF_3$) and silicon tetrafluoride. The reaction was continued over a period of about 1½ hours at a temperature range of from about 110° to about 160° C.

Following the run, the solid residue from the reaction mass was analyzed by wet chemical methods, the fluoride to potassium ratio in the residue showing about 46.5% of the available fluorine had been volatilized as $PF_5$. X-ray analysis of the solid residue showed KCl and unreacted $KPF_6$ indicating the reaction apparently followed the reaction: $PCl_5 + 5KPF_6 \rightarrow 6PF_5 + 5KCl$.

*Example 2*

Seventy-five grams of $KPF_6$ were placed in a reactor similar to that described for Example 1. Anhydrous HCl was passed through the $KPF_6$ bed for a total of about 3 hours on a continuous basis at a flow rate of approximately 0.4 cubic foot/hour.

The reactor was heated slowly and the product gases were periodically analyzed by infrared techniques. At temperatures up to about 200° C., hydrogen chloride was indicated to be the prime gaseous component exiting from the reactor. Above 200° C., $SiF_4$ was found to be present in the product stream and a sample taken at 300° C. showed the presence of $POF_3$. Analysis of the product gas stream at 360° C. showed phosphorus pentafluoride to be a significant portion of the product mixture. The reaction was continued for about 1.5 hours at a temperature of about 350–360° C.

Analysis of the solid residue by wet chemical methods for fluoride and potassium indicated about a 79% conversion of the $KPF_6$ charged to the reactor. A sample of the reaction residue upon X-ray diffraction analysis showed KCl and unreacted $KPF_6$ to be present.

*Example 3*

The same reactor used in Example 1 was charged with about 25 grams of $KPF_6$ (about 0.14 gram mole) and about 10 grams of substantially anhydrous $FeCl_3$ (about 0.6 gram mole). As the reactor was slowly heated, perceptible gas evolution was noticed. The gas evolution became rapid as the reactor temperature reached about 110° C. The reaction was continued for about one hour subsequent to this time during which period the temperature rose to about 180° C. Analysis of the solid residue remaining in the reactor indicated that about 70 percent of the phosphorus in the $KPF_6$ charge had been converted and volatilized, primarily as $PF_5$, from the reactor.

In a manner similar to the foregoing, sodium hexafluorophosphate can be heated with phosphorus pentabromide to prepare phosphorus pentafluoride. Likewise, a mixture of rubidium hexafluorophosphate and ferric chloride can be used in the present process to prepare phosphorus pentafluoride.

Various modifications can be made in the present process without departing from the spirit or scope thereof for it is understood that I limit myself only as defined in the appended claims.

I claim:
1. A process for preparing phosphorus pentafluoride which comprises; reacting an alkali metal hexafluorophosphate with a substantially anhydrous, acidic inorganic halide at a temperature of from about 100° C. to about 400° C. wherein the molar ratio of said inorganic halide and said hexafluorophosphate ranges from about 0.4 to about 2 based on that required for stoichiometric reaction between said inorganic halide and said hexafluorophosphate, said substantially anhydrous, acidic inorganic halide being a member selected from the group consisting of hydrogen chloride, phosphorus pentachloride, antimony pentachloride, iron trichloride, chromium trichloride, aluminum trichloride, stannic chloride and mixtures thereof.

2. A process for preparing phosphorus pentafluoride which comprises; reacting at a temperature from about 200° C. to about 350° C. an alkali metal hexafluorophosphate with a substantially anhydrous inorganic chloride selected from the group consisting of hydrogen chloride, phosphorus pentachloride, antimony pentachloride, iron trichloride, chromium trichloride, aluminum trichloride, stannic chloride and mixtures thereof wherein the molar ratio of the inorganic chloride and the hexafluorophosphate ranges from about 0.4 to about 2 based on that required for stoichiometric reaction between said inorganic chloride and said hexafluorophosphate.

3. The process as defined in claim 2 wherein the substantially anhydrous inorganic choride is phosphorus pentachloride and the hexafluorophosphate is potassium hexafluorophosphate.

4. The process as defined in claim 2 wherein the substantially anhydrous inorganic chloride is hydrogen chloride and the hexafluorophosphate is potassium hexafluorophosphate.

References Cited by the Examiner
UNITED STATES PATENTS

| | | | |
|---|---|---|---|
| 1,688,503 | 10/28 | Miner | 23—205 |
| 2,810,629 | 10/57 | Muetterties | 23—205 |

FOREIGN PATENTS

| | | |
|---|---|---|
| 814,139 | 9/51 | Germany. |

MAURICE A. BRINDISI, *Primary Examiner.*